United States Patent [19]
Yoshimura et al.

[11] 4,371,256
[45] Feb. 1, 1983

[54] APPARATUS FOR HANDLING AN ORIGINAL AND A RECORDING SHEET IN A RECORDING DEVICE

[75] Inventors: Shigeru Yoshimura, Yokohama; Katsuichi Shimizu, Hoya, both of Japan

[73] Assignee: Canon Kabushiki Kaisha, Tokyo, Japan

[21] Appl. No.: 97,862

[22] Filed: Nov. 27, 1979

Related U.S. Application Data

[62] Division of Ser. No. 911,141, May 31, 1978, Pat. No. 4,202,621.

[30] Foreign Application Priority Data

Jun. 3, 1977 [JP] Japan .................................. 52-65416
Jun. 14, 1977 [JP] Japan .................................. 52-70074
Jun. 27, 1977 [JP] Japan .................................. 52-76391

[51] Int. Cl.³ ............................................. G03G 15/00
[52] U.S. Cl. ............................... 355/14 SH; 355/35 H
[58] Field of Search .................. 355/35 H, 145 H, 50, 355/51, 48, 49, 55-60; 271/9

[56] References Cited

U.S. PATENT DOCUMENTS

| | | | |
|---|---|---|---|
| 3,623,806 | 11/1971 | Short | 355/14 SH |
| 4,046,469 | 9/1977 | Frank et al. | 355/13 |
| 4,077,714 | 3/1978 | Komori et al. | 355/51 |
| 4,093,372 | 6/1978 | Guenther | 355/50 |
| 4,135,808 | 1/1979 | Morrison | 355/14 SH |
| 4,170,414 | 10/1979 | Hubert et al. | 355/14 SH |

Primary Examiner—Richard L. Moses
Attorney, Agent, or Firm—Fitzpatrick, Cella, Harper & Scinto

[57] ABSTRACT

A recording device for reproducing an image from an original onto a recording medium as a visible image. The device includes a mounting table for supporting the original and a feeding device for feeding the original onto the mounting table. A detector device detects the arrival of the original at a predetermined position on the mounting table, and recording apparatus then records the information from the original onto a recording sheet. Recording is initiated by an instruction device in response to an output from the detector. A conveyor for the recording sheet then carries the recording sheet along a discharge path wherein a folding device is selectably operable to move the sheet against a stopping device to impart a fold to the sheet, whereupon the sheet is discharged to a tray in a folded or unfolded state.

20 Claims, 19 Drawing Figures

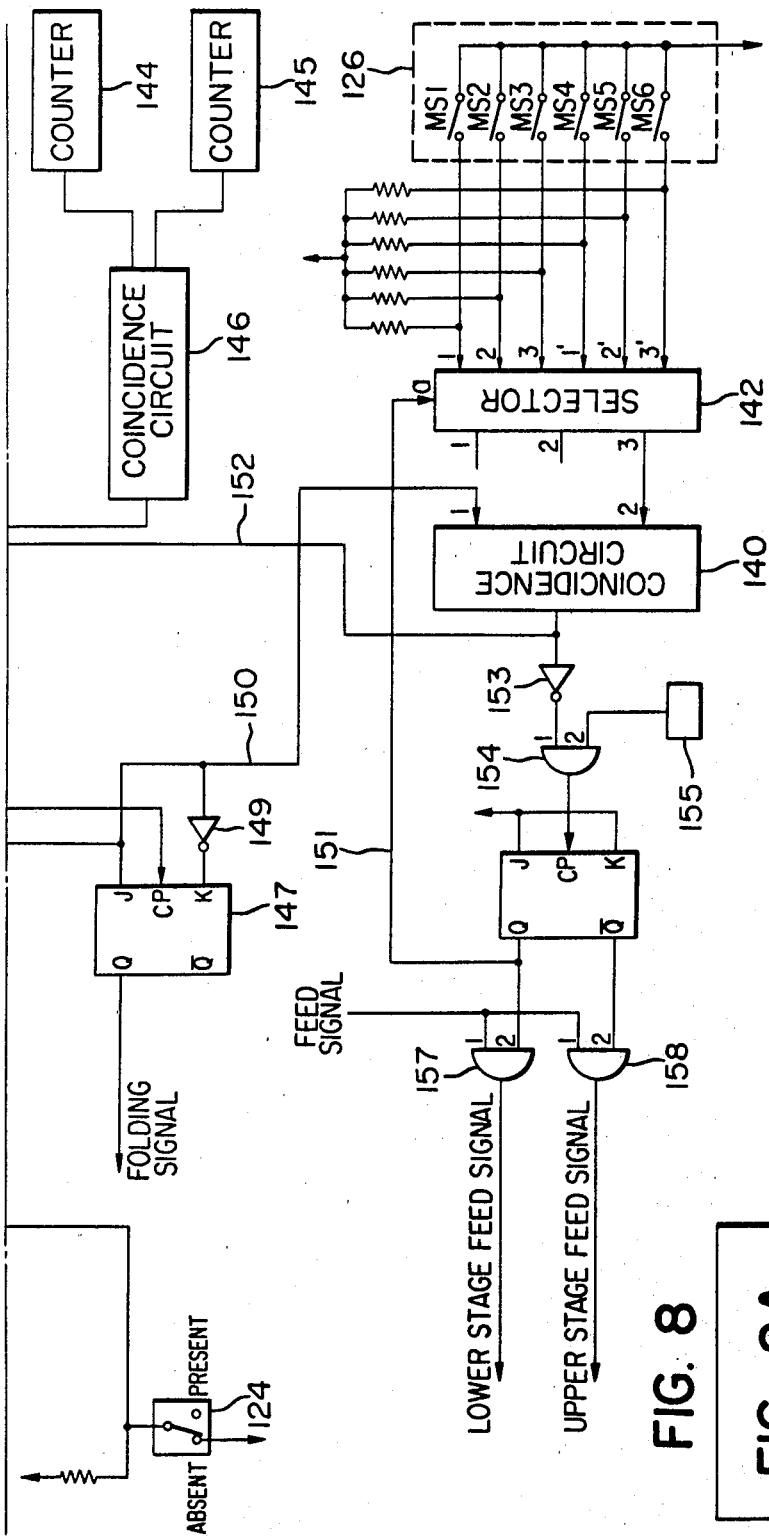

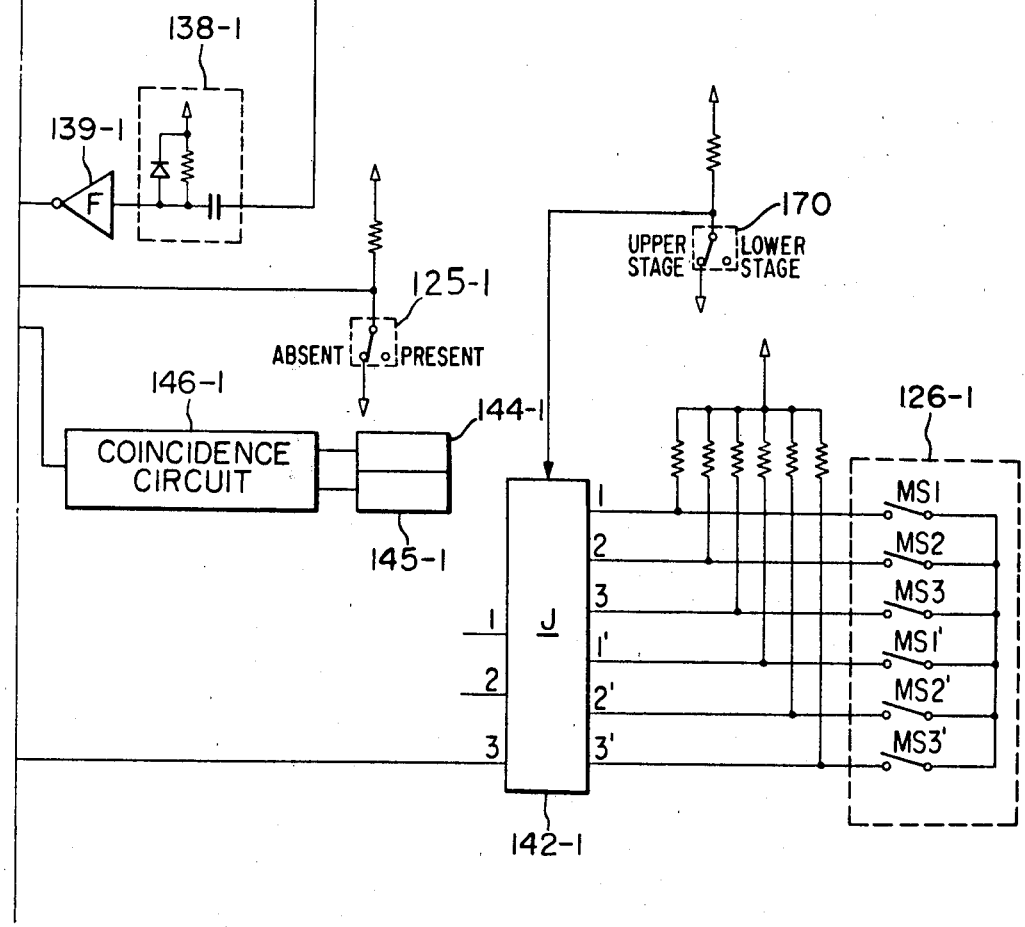

APPARATUS FOR HANDLING AN ORIGINAL AND A RECORDING SHEET IN A RECORDING DEVICE

This is a division of application Ser. No. 911,141, filed May 31, 1978 now U.S. Pat. No. 4,202,621.

BACKGROUND OF THE INVENTION a. Field of the Invention

This invention relates to a recording device capable of automatically producing an image-recorded medium in a desired form.

b. Description of the Prior Art

There have been known various types of recording device, wherein image informations are recorded on an image recording medium in a sheet form. All these recording devices, however, require human operators to attend all the time during the image recording operations so as to given the devices various instructions, or to carry out various pre-treatments and post-treatments.

It is generally desirable that such instructions to be given to the recording devices or such treatments for obtaining the image-recorded medium be performed by the device per se as far as possible so that the considerable amount of time to be spent by the human operators may be reduced. For example, when the sheet recording medium, on which image informations have been recorded, is large in size, the image-recorded medium should preferably be folded for storage. Heretofore, practice has been such that the sheet recording medium discharged from the recording device is folded by the operator, and after completion of the entire reproduction operations, all the image-recorded sheets are compiled in the order of reproduction. In another aspect, in the recording device of a type in which an image original is placed on an image mounting table, and this image original is optically scanned to record the image on the sheet recording medium, it has been necessary that, after predetermined numbers of copy sheets have been obtained from a single image original, the operator removes this image original and replaces it with a new image original placed at a predetermined location, after which instructions for commencement of the recording operations are given to the recording device.

As mentioned in the preceding, if the image-recording operations require many steps to be done by the operator a, considerable amount of processing time becomes necessary, even when the recording speed of the device per se is fast with the consequence that the overall recording speed of the device decreases substantially.

SUMMARY OF THE INVENTION

It is therefore an object of the present invention to provide a recording device capable of producing an image-recorded sheet medium, on which image informations have been recorded, in any desired form with the least pre- and post-treatment thereon being required by a human operator.

It is another object of the present invention to provide a recording device capable of discharging the image-recorded sheet medium in a folded state.

It is still another object of the present invention to provide a recording device capable of discharging the image-recorded sheet medium in a folded state in accordance with a size of the sheet recording medium.

It is other object of the present invention to provide a recording device capable of discharging the image-recorded sheet medium in a folded state in accordance with a size of an image original.

It is still other object of the present invention to provide a recording device capable of automatically feeding a plurality of image originals to be reproduced and of sequentially recording the image informations in each image original onto the sheet recording medium.

It is a further object of the present invention to provide a recording device capable of selecting an appropriate sheet recording medium conforming to a size of the image original by detecting the size of the image original to be reproduced.

DESCRIPTION OF THE PREFERRED EMBODIMENTS

In the following, the present invention will be explained in detail for one embodiment thereof in reference to the drawings. First of all, one embodiment of the reproduction apparatus constituting a part of the present invention will be described.

The recording device according to this embodiment is a powder-development-and-image-transfer type reproduction apparatus, in which an image original to be reproduced may be of any type such as sheet as in general documents, books or like other bound papers, and so forth.

Figure 1:
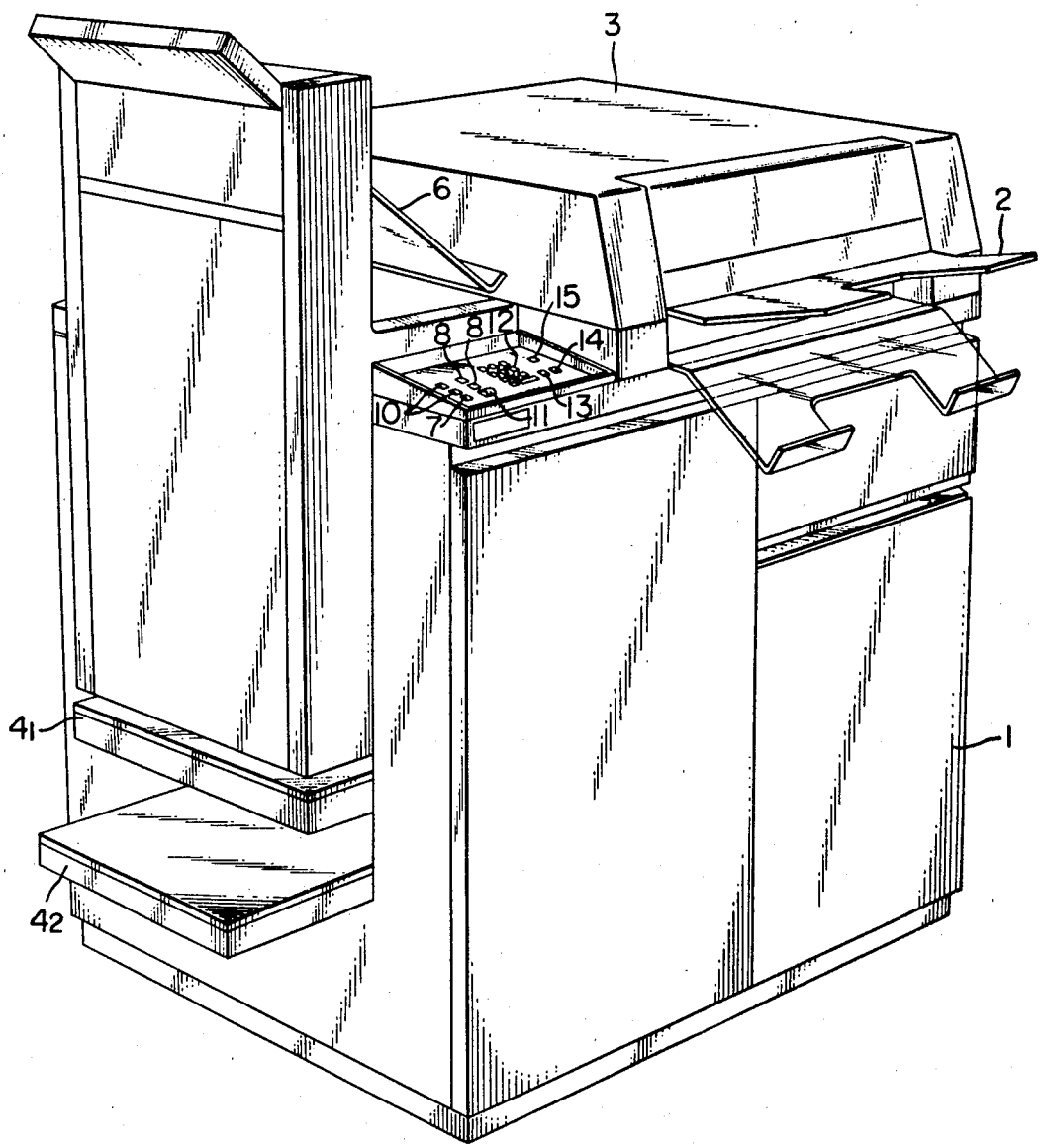
FIG. 1 is a perspective view showing an outer appearance of the recording device according to the present invention.
Figure 2:
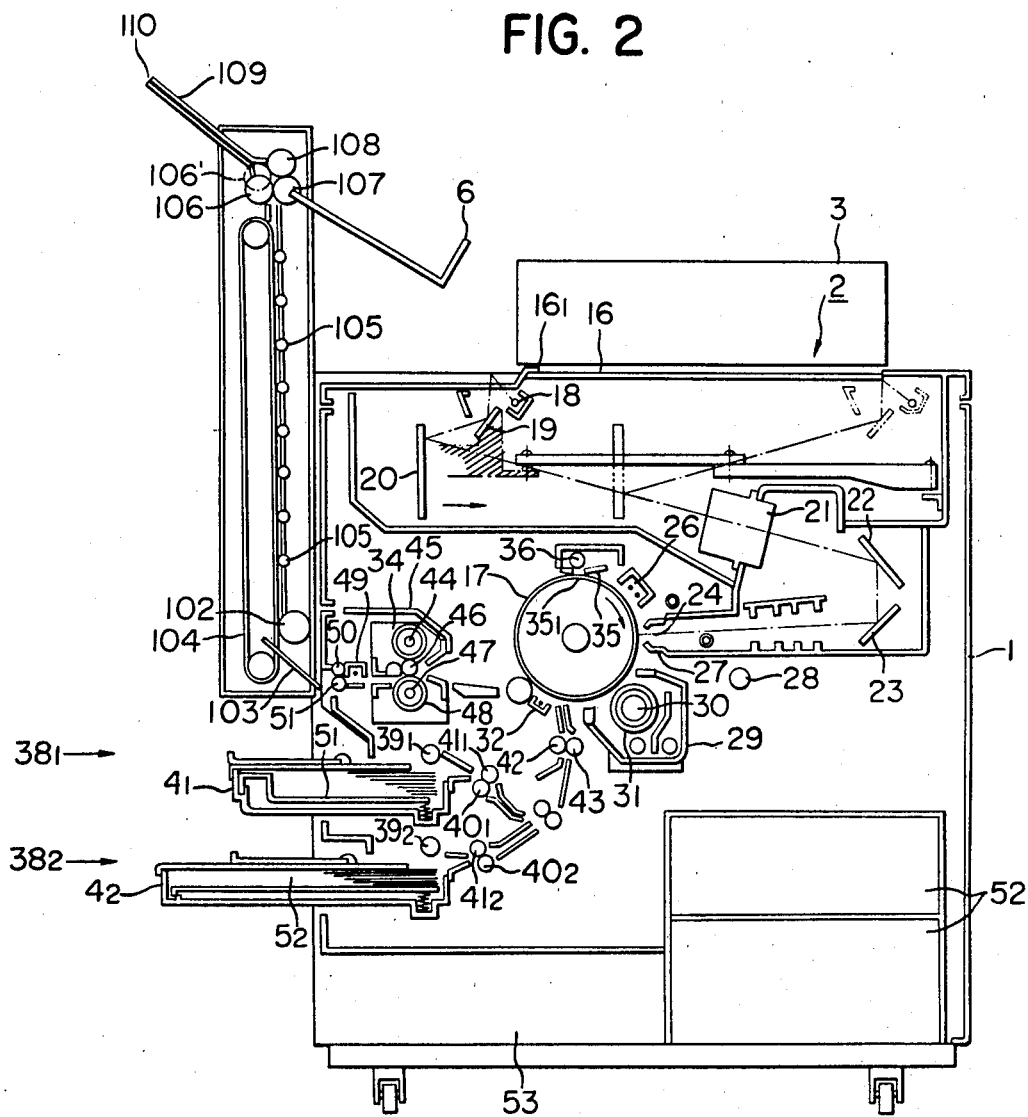
FIG. 2 is a cross-sectional view of the recording device shown in FIG. 1.

Referring to FIGS. 1 and 2, a reference numeral 1 designates a machine casing, 3 refers to an automatic document feeder (ADF) which sequentially feeds the image originals onto an image original mounting table 16 to be described later, and 2 denotes an image original stacking table, on which image originals to be fed to the original mounting table are stored in stack. $4_1$ and $4_2$ designate cassettes for accommodating therein image transfer paper $5_1$ and $5_2$ as the sheet recording medium, and 6 refers to a tray, on which the image transfer paper discharged out of the reproduction apparatus is temporarily stored after the image transfer operations. 7 refers to a main switch, 8 warning indicator sections, 10 paper size indicator sections, 11 an image density adjusting dial, 12 a continuous reproduction sheet number selection key, 13 a continuous or multiple copy button interconnected with the continuous reproduction sheet number selection key 12, 14 a single copy button which is not inter-connected with the continuous reproduction. A hopper to accommodate therein developer for replenishment and to supply the same depending on necessity is disposed at a position of a front right door.

The operations of this reproduction apparatus will now be explained in reference to FIG. 2. An image original to be reproduced is placed by the automatic original feeder 3 on the original mounting table 16 made of glass with the tip end thereof being registered with the extreme end 161 of the glass table. Next, when the single copy button 14 is depressed, or the continuous or multiple copy button 13 is depressed after the copy sheet numbers are set by the selection key 12, a photosensitive drum 17 commences its rotation in the clockwise direction as shown by an arrow. When the photosensitive drum 17 reaches a predetermined position and a signal for commencing image exposure is emitted, an illuminating lamp 18 and a first mirror 19, both of which are the movable parts in the optical system, begin to move in the right direction as arrowed in the drawing at the same speed as the circumferential speed of the rotating photosensitive drum 17, while a second mirror 20 also commences movement in the rightward direction at a speed half that of the circumferential speed of the drum. The image of the original which has been illuminated by the illuminating lamp 18 from below is focussed on the photosensitive drum 17 at its designated exposure section 24 as an information light. When the image exposure is completed, the movable parts of the optical system detect their positions, stop further rightward movement, and immediately return in the opposite direction, i.e., leftward. The speed at this returning motion is made faster than that at the forward motion so as to increase efficiency in reproduction operations. As soon as the movable parts have returned to their initial positions, the driving force to the movable optical system is interrupted and the operations stop.

In case multiple copies are to be obtained continuously from one and the same image original, the numbers of copy sheets as desired may be designated in the reproduction apparatus by means of the continuous reproduction sheet number selection key 12, followed by commencement of the reproduction operations through depression of the continuous or multiple copy button 13. Also, when the reproduction operations are started by means of the single copy button 14, such single copy can be obtained irrespective of the copy sheet numbers as instructed by the reproduction sheet number selection key 12.

The photosensitive drum 17 is of a three-layer structure consisting of an electrically conductive substrate coated thereon with a photosensitive layer, on which a transparent insulative layer is overlaid. This drum 17 rotates clockwise as shown in FIG. 2. This photosensitive drum 17 is first charged in the positive $\oplus$ polarity by a positive charger 26 which is supplied with an electric current in the positive polarity from a high voltage power source. After rotation, when the drum arrives at the image exposure section 24, it is exposed with an image of the original through a slit at this section, and, at the same time, subjected to an a.c. electric charge (charge removal) by an a.c. charger 27 which is supplied with an a.c. electric current from the high voltage power source. Subsequently, by an overall exposure to be rendered thereon by an overall exposure lamp 28, an electrostatic latent image is formed on the surface of the photosensitive drum 17. After formation of the electrostatic latent image thereon, it further rotates to a position of a developing device 29. In this developing device 29, a magnet brush consisting of a carrier and a toner on a sleeve 31 rotating around a magnet 30 contacts the drum surface, whereby the electrostatic latent image on the photosensitive drum 17 is developed, and rendered visible. Subsequently, an image transfer paper 5 which has been forwarded from the paper feeding section closely contacts the peripheral surface of the photosensitive drum 17, and the developed image on the drum surface is transferred onto the image transfer paper 5 by electric charging of positive $\oplus$ current from the high voltage power source through an image transfer charger 32. The image transfer paper 5 which has completed its image transfer is separated from the photosensitive drum 17 with its one end being restrained by a separating belt, and led to an image fixing device 34. In the meantime, the the toner remaining photosensitive drum is wiped off with an edge $35_1$ of a cleaning blade 35, which press-contacts against the drum surface, so as to be ready for repeating the next reproduction cycle. The toner which has been wiped off the drum by the cleaning blade 35 rides thereon to be taken away from the area of the photosensitive drum 17 by a screw conveyor 36 to the front side of the drum, and is then led into the developing device 29 through a duct, and re-used for the development. The image transfer paper $5_1$ is placed in the cassette $4_1$, and the image transfer paper $5_2$ in the cassette $4_2$, respectively. These cassettes $4_1$ and $4_2$ are loaded in paper feeding sections $38_1$ and $38_2$ at the lower left portion of the reproduction apparatus in a detachable attachable manner. The cassettes are various in size in conformity with sizes of the image transfer paper, and can be readily replaced depending on necessity. Selections of the paper feeding from the paper feeding sections $38_1$ or $38_2$ are effected by an automatic cassette selection device to be described hereinafter. When the photosensitive drum 17 arrives at a predetermined position to emit a paper feeding signal, a paper feeding roller $39_1$ or $39_2$ which is constantly rotating is urged on the top surface of the image transfer paper $5_1$ or $5_2$, whereby the paper is fed out in the rightward direction as shown in the drawing. Then, while it is being forwarded, the image transfer paper is rectified of its slant movement, if any, by first register rollers $40_1$, $41_1$, or $40_2$, $41_2$, so as to be forwarded in the correct, straightforwarded direction. Continuously, the image transfer paper 5, after it has taken synchronism with the image on the photosensitive drum 17 with a signal from the movable optical part by means of second register rollers 42, 43, is closely contacted on the drum surface to be subjected to the image transfer. After completion of the image transfer, the image transfer sheet is peeled off the surface of the photosensitive drum 17 by the separation belt, and sent into the image fixing device 34. In this image fixing device 34, the image transfer sheet having on its surface a non-fixed transferred image passes between a resilient image fixing roller 46 which has been heated by a heating roller 45 incorporating therein a heater 44 and an opposite roller 48 also having therein a heater 47, during which the paper and non-fixed image thereon are heated, the toner is fusion-bonded to the paper, and the image is firmly fixed on the image transfer paper 5. The paper which has passed through the image fixing device 34 is finally removed of any electric charge remaining on its surface by an electric charge remover 49, and is then discharged onto a guide plate 103 of a sheet folding device by means of discharge rollers 50, 51.

The photosensitive drum 17 of this reproduction apparatus is capable of performing reproduction of an A-3 paper size having a width of 297 mm and a length of 420 mm, and the circumference of the drum is slightly longer than the paper length of 420 mm. The return motion of the movable optical system followed by its forward motion (i.e., exposure process) is required to be somewhat shorter than the forward movement. Accordingly, in the case of A-3 size reproduction, the image-recording can be done per two revolutions of the photosensitive drum, while, in the case of A-4 size reproduction, the image recording can be done per one revolution of the drum with the image transfer paper being fed with its longer side as the width (breadthwise forwarding). The difference in the rotational cycle of the photosensitive drum due to the paper size as mentioned above is discriminated by a signal from the cassette $4_1$ or $4_2$ as selected by the automatic cassette selecting device, thereby controlling the moving quantity of the movable optical system.

After completion of the reproduction operations, the photosensitive drum stops its rotation when the rear end of the image transfer paper 5 has finished passing through the discharge rollers 50, 51. In this case, the drum is so made to stop at a position where the edge $35_1$ of the cleaning blade 35 may come to the vicinity of a seam of the photosensitive layer, i.e., to a portion where no image appears, in order to avoid any undesirable influence on the image arising from constant press-contact of the cleaning blade 35 on the surface of the photosensitive drum 17. Incidentally, reference numerals 52, 53 designate storage spaces for the image transfer paper 5, cassettes 4, developing agents, and other supplies.

In the following, detailed explanations will be given as to the automatic document feeder (ADF) in reference to FIGS. 3A and 3B.

An image original switch 121 consisting of a detection element such as a microswitch is provided on one part of the image original stacking table 2 of the ADF so as to detect whether the image original 202 is present on the table 2, or not.

The image original to be used may be a full size (e.g. A-3 (297 mm×420 mm), B-4 (257 mm×364 mm) sizes), or a half size (i.e. half of the abovementioned full size such as A-4 (210 mm×297 mm), B-5 (182 mm×257 mm) sizes). The image originals are placed on the image original stacking table 2 in such a manner that, in the case of the full size original, it may be placed with its short side being conformed to the forwarding direction of the original, i.e. breadthwise forwarding, and, in the case of the half size original, it may be placed with its long side being conformed to the forwarding direction of the original, i.e., lengthwise forwarding.

Figure 8A:
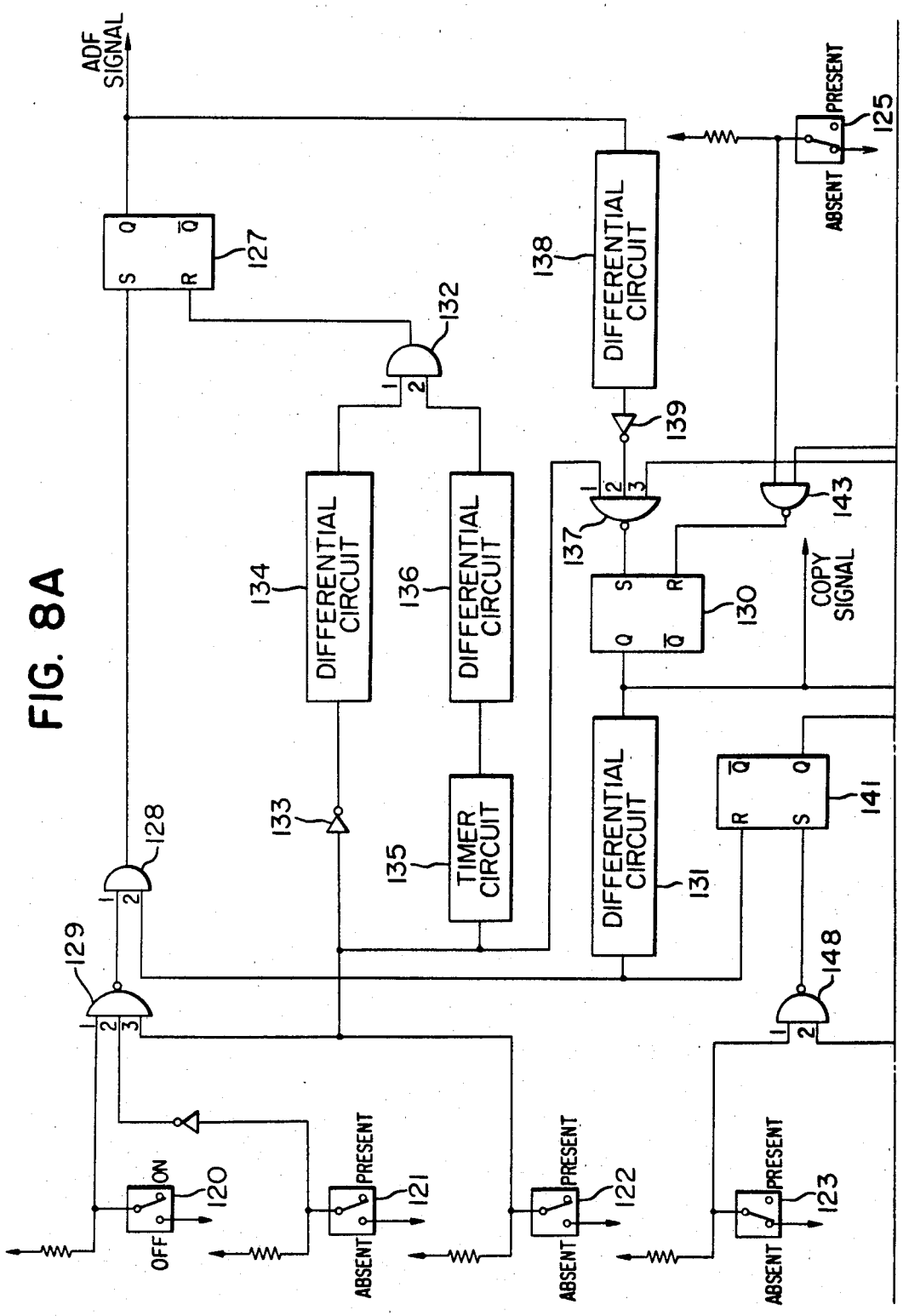
FIG. 8 is a circuit diagram showing a main part of a control circuit for the recording device according to the present invention.

The image original placed on the image original stacking table 2 is lifted by a rotor 204, held between the rotor 204 and a roller 205, and carried to a conveyor belt 211. Timing for feeding out the image original is determined by lowering a timing roller 206 from its illustrated position. Passage of the image original fed out onto the conveyor belt 211 is detected by a switch 123 consisting of a light emitting element 208 and a light receiving element 209. That is, as shown in FIG. 3B, the switch 123 is disposed at a position where both full size original 202-1 (in solid line) and half size original 202-2 (in dot line) pass through without exception. This is shown in FIG. 8 as an image original detection switch 123.

Figure 3A:
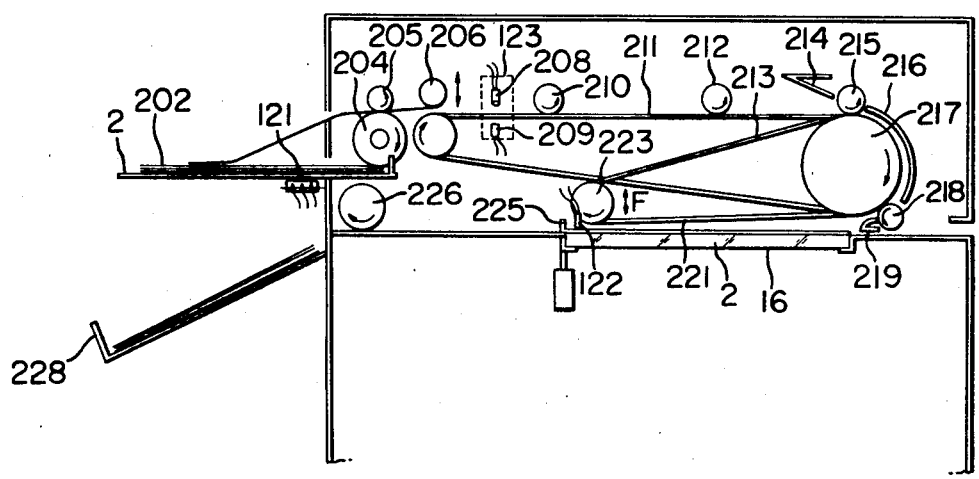
FIGS. 3A and 3B are respectively a cross-sectional view and a top plan view of an automatic image original feeding device.
Figure 3B:
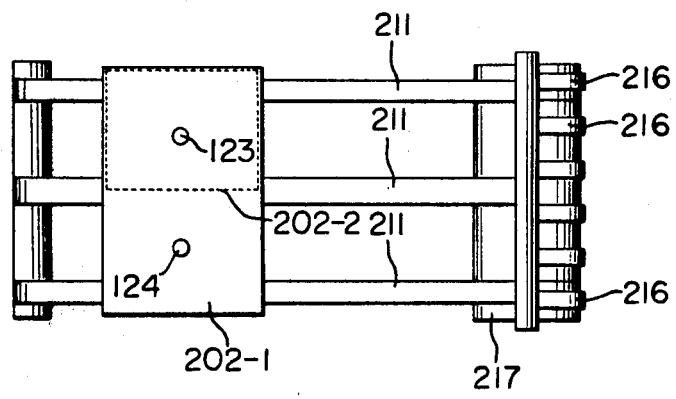

Juxtaposed with this switch 123, is a switch 124 of the same construction, as shown in FIG. 3B. This switch 124 is disposed at a position where the full size original passes, but the half size original does not pass therethrough. In FIG. 8, this is shown as an image original size detection switch 124.

It goes without saying that, when the half size original is forwarded breadthwise, and the full size original lengthwise, the size of the image original can be detected from its passing time, and presence of the image original can also be detected, whereby the abovementioned light emitting element and the light receiving element can be in a single set.

Owing to presence of urging rollers 210, 212 on the top surface of the conveyor belt 211, the image original placed on this bolt 211 is conveyed to the rightward direction in FIGS. 3A and 3B and sent to the image original mounting table 16 made of glass plate through a guide member 214, rollers 215, 217, a guide member 216, rollers 217, 218 and a guide member 219.

Between the abovementioned roller 217 and another roller 223, there is further extended a belt 221. Since the roller 223 moves up and down as shown by an arrow F, the image original which has been sent to the image original mounting table 16 can be further transferred to the leftward direction in the drawing by lowering the roller 223.

A stopper 225 is provided at the left end of the image original mounting table 16, which works to stop further movement of the image original when it collides with the stopper. At the same time, the rotation of a motor (not shown) is stopped by a detected output of the edge of the original from an image original edge detector 122 to thereby stop driving of the conveyor belt and rollers for the image original.

After completion of a predetermined reproduction of the image original, a plunger 225-1 is driven by application of a stopper retraction signal, whereby the abovementioned stopper 225 retracts from the image original conveying path, the roller 223 moves downward and rotates to convey the image original in the leftward direction in the drawing, and the image original is discharged onto an image original discharge tray 228 by means of a discharging roller 226.

In the following, explanations will be made as to the sheet feeding device in reference to FIGS. 2, 4, 5 and 6.

Figure 4:
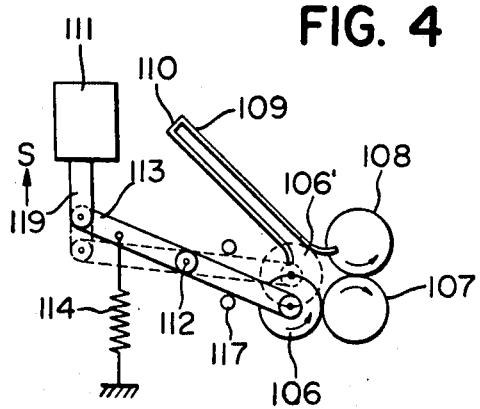
FIG. 4 is a cross-sectional view of a device for folding an image-recorded sheet medium.
Figure 5A:
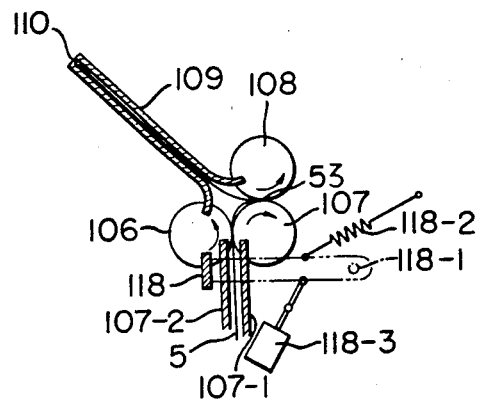
FIGS. 5A and 5B are respectively cross-sectional views of the sheet folding device, in which the former shows the device in its folding operation, and the latter shows the device after it has completed the folding operation.
Figure 5B:
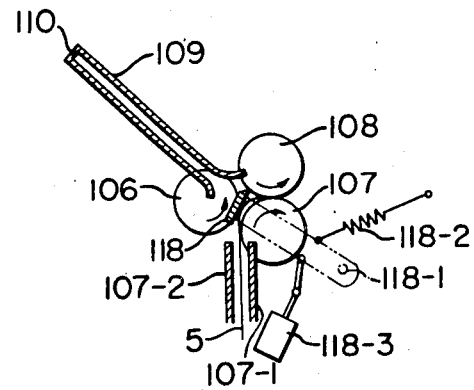

The image transfer paper 5 discharged by the rollers 50, 51 to a position lower than the level of the abovementioned image original mounting table 16 is led by a guide plate 103, lifted upward by a forwarding roller 102 and a conveyor belt 104, and guided to the sheet folding section (or folding means) by urging rollers 105 through guide plates 102-1, 102-2. As shown in FIGS. 4, 5A and 5B, the sheet folding section consists of a pair of rollers 107, 108, a roller 106 to be controlled by a plunger 119 as in FIGS. 5A or 5B, a sheet receiving and storing section 109 which temporarily stores any of the designated sizes of the image transfer paper 5 when it is to be folded, and a guide plate 118 fixed at one end of an arm 118-2 which is in turn held at the other end thereof on a shaft 118-1 in a freely rotatable manner.

The operations of this sheet folding section will be explained in the following. When the image transfer paper 5, which has been upwardly transported by the conveyor belt 104 and the urging rollers 105, is in the half size, no folding signal shown in FIG. 8 is emitted. Accordingly, the guide plate 118 (regulating member) is at a position shown in FIG. 5B by a spring 118-2, while the roller 106 is at a position (shown in FIG. 5B) where an arm 113 and a stopper 116 contact each other as shown by a dot line in FIG. 4 by force of a spring 114 which pulls the arm 113 holding the roller 106 in a freely oscillatable manner by a shaft 112. Accordingly, the image transfer paper 5 which has been brought upward from below as shown in FIG. 5B is guided by the guide plate 118 between the rollers 107, 108, and discharged to a tray 6 as it is. Since this tray 6 is at a higher position than the image original mounting table 16, the operator of the reproduction apparatus can take out the image transfer paper thereon very easily.

In contrast to this, when the image transfer paper 5 is in the full size, a "folding signal" is emitted from the circuit shown in FIG. 8.

When this folding signal is emitted, the guide plate 118 moves to a position shown in FIG. 5A by means of a plunger 118-3 which is an electro-magnetic actuating device, and, at the same time, the plunger 119 is driven in the direction of an arrow S against force of the spring 114 by means of a solenoid 111, and kept at a position where the arm 113 contacts the stopper 117 and stops further movement. In this consequence, the image transfer paper 5 is held between the rollers 106, 107, and is sent into the sheet receiving and storing section 109.

As shown in FIG. 5A, when the image transfer paper 5 is further transported upward by the rollers 106, 107, even after the tip end thereof collides with an end part 110 of the sheet receiving and storing section 109 (this end part constituting the engaging and stopping member of the image transfer paper), a part 53 of the image transfer paper 5 is bent, and gripped between the rollers 107, 108 to be folded, and then discharged onto the tray 6. Accordingly, by appropriately setting a distance between the engaging and stopping member 110 and the rollers 107, 108, the image transfer paper in the full size can be folded in half.

Figure 6:
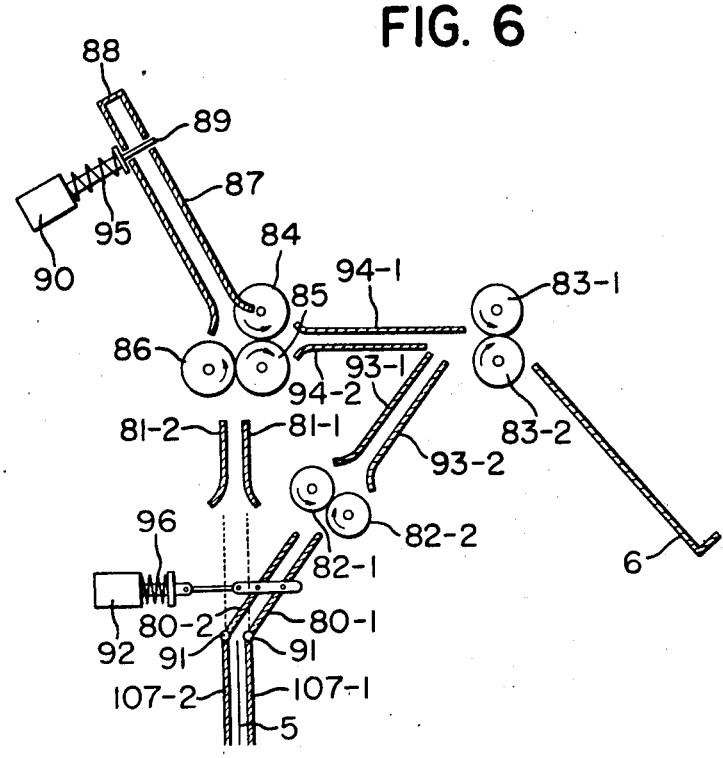
FIG. 6 is a cross-sectional view of another embodiment of the sheet folding device.

FIG. 6 shows another embodiment of the sheet folding section, wherein separate discharging sections are provided, the one for the folded image transfer paper 5, and the other for such image transfer paper which is not folded. In more detail, a pair of direction changing guide plates 80-1, 80-2 are pivotally provided on shafts 91, 91 at the end parts of the abovementioned guide plates 107-1, 107-2. The direction changing guide plates 80-1, 80-2 are so controlled that they may take two positions selectively by means of a plunger 92. That is, as shown in FIG. 6, they are controlled in such a fashion that the opening of the guide plates may be directed to meeting point of the rollers 82-1, 82-2, and in such other fashion that the opening thereof may be directed to an opening of the guide plates 81-1, 81-2.

Since the rollers 82-1, 82-2 and 83-1, 83-2 are constantly rotating in the arrowed directions, the image transfer paper 5 which has been guided between the guide plates 107-1, 107-2 is further guided between the guide plates 80-1, 80-2 to reach the rollers 82-1, 82-2, if and when the abovementioned direction changing guide plate 80 is in a state as shown in the drawing by force of a spring 96 without their being driven by the plunger 92. The image transfer paper 5 held between the rollers 82-1, 82-2 is further guided by the guide plates 93-1, 93-2 to the rollers 83-1, 83-2, after which it is discharged on the tray 6. On the other hand, since rollers 84, 85, and 86 are also constantly rotating in the arrowed direction, if the abovementioned plunger 92 is driven against the force of the spring 96 so as to shift the opening of the direction changing guide plates 80-1, 80-2 to meet the opening of the guide plates 81-1, 81-2 (i.e., if the direction changing guide plates 80-1, 80-2 are shifted to the position indicated by dot lines in the drawing), the image transfer paper 5 passes through the guide plates 107-1, 107-2, the direction changing guide plates 80-1, 80-2, and the guide plates 81-1, 81-2, and then is led to the rollers 85, 86.

The image transfer paper 5 held between the rollers 85, 86 is forwarded into the sheet receiving and storing section 87, and is folded when its forward end contacts the engaging and stopping member 88, or 89. The folded end part of the paper is then held between the rollers 84, 85, after which it is discharged onto the tray 6 through the guide plates 94-1, 94-2 and the rollers 83-1, 83-2. The engaging and stopping member 89 is so constructed that it may be projected into, or retracted from, the abovementioned sheet receiving and storing section 87 by a plunger 90 in accordance with a size of the image transfer paper 5 to be folded.

While it is desirable that the folding section shown in FIGS. 4 and 6 should fold the image transfer paper 5 in half with respect to the conveying direction of the paper, if a distance between the engaging and stopping member 110 and the rollers 107, 108 is constant as shown in FIGS. 4 and 5, a folding length also becomes constant with the consequent inability to fold the same in half, when the paper size is changed. In order to avoid such inconvenience, the embodiment shown in FIG. 6 is so designed that, by changing the position of the engaging and stopping member depending on the paper size, it may always be folded exactly in half. For instance, when an A-3 size image transfer paper is fed, the plunger 90 is driven against the spring 95 to retract the engaging and stopping member 89 from the conveying path in the sheet receiving and storing section 87, whereupon the innermost wall 88 of the section 87 becomes the engaging and stopping member. Also, when a B-4 size image transfer paper is fed, the plunger 90 is not driven, but the engaging and stopping member 89 is caused to project into the sheet receiving and storing section 87 by force of the spring 95.

The control of the abovementioned plunger 92 can be done by use of a folding signal applied to the abovementioned plunger 111. Also, the control of the plunger 90 can be done in such a manner that outputs 1, 2, and 3, from a selector 142 to be described later, be decoded to discriminate a size of the selected cassette, and, when the size is, for example, A-3, the plunger 92 be driven.

Figure 7A:
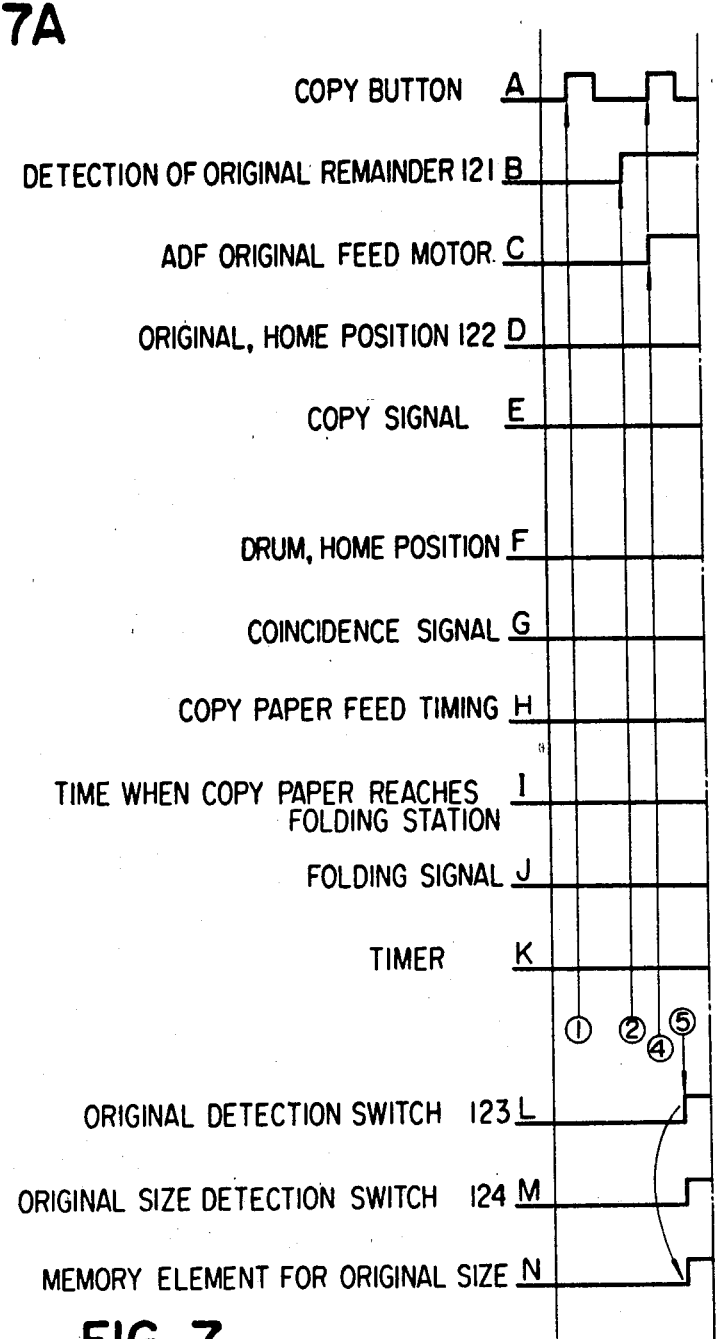
FIG. 7 is a signal waveform chart showing operative states of the recording device according to the present invention.
Figure 7:
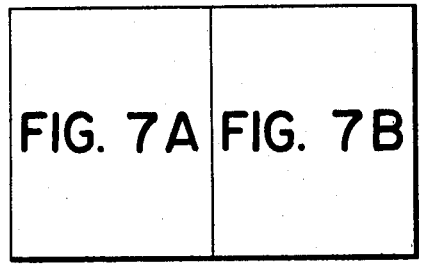
Figure 7B:
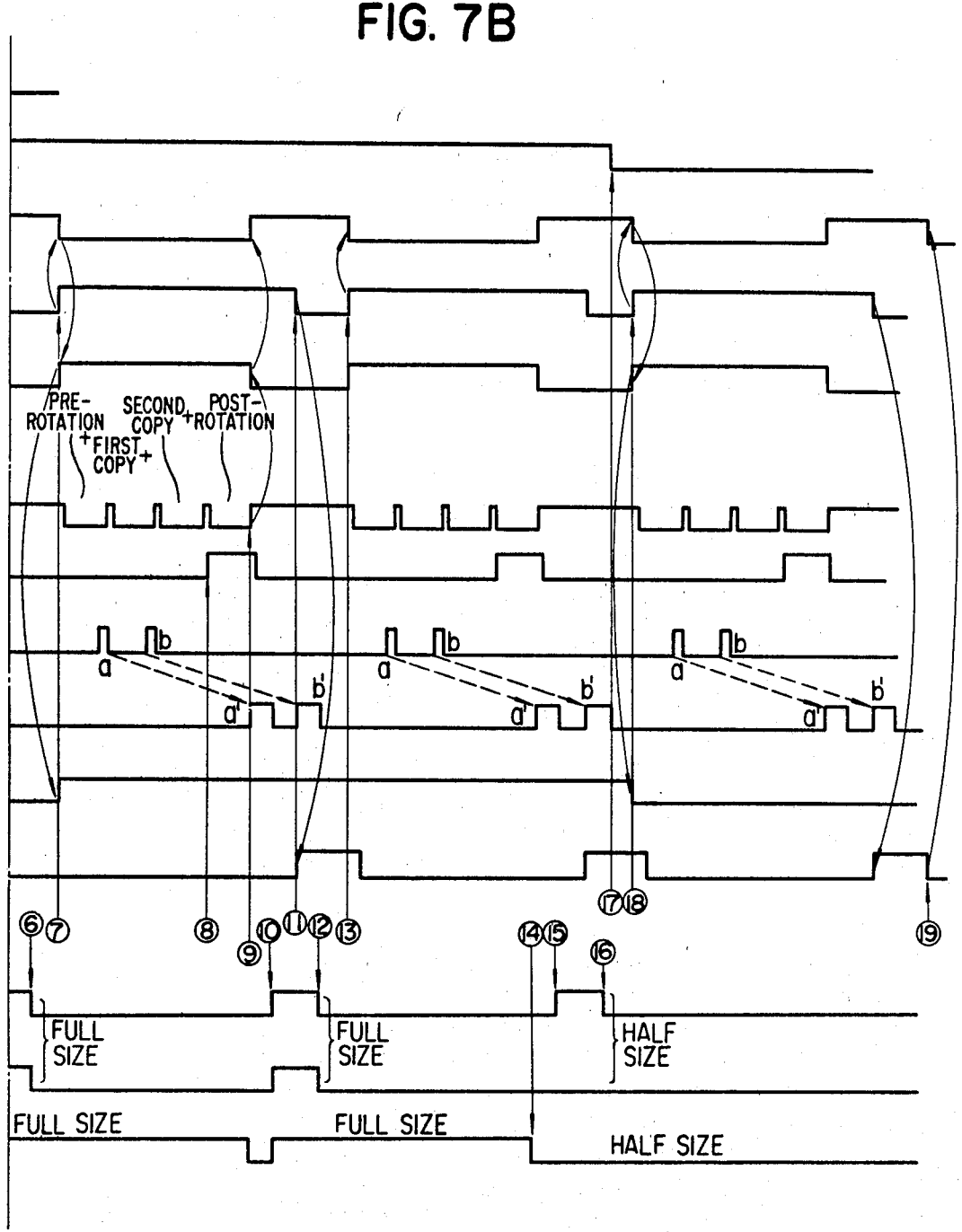

FIG. 7 is a timing chart for obtaining two copies each for every image original forwarded to the image original mounting table from the ADF by means of the reproduction apparatus according to the present invention. First, the timing 1 indicates that the operator pushed the copy button B, but no operation of the apparatus is effected, because there is no image original set in the ADF. The timing 2 indicated that the operator, noticing that no image original is set, has placed the image originals on the image original stacking table 2. The timing 4 indicates that the operator has again depressed the copy button, and that, as the result of this depression, the copying conditions have been set and the ADF original feeding motor is driven to take out one image original from the stack and send it to the image original mounting table. The timing 5 indicates that an image original in full size (e.g., A-3 size) has been fed, the image original detection switch 123 and image original size detection switch 124 are actuated, and the image original size memory element has been set. The timing 6 indicates that the abovementioned image original has passed through the abovementioned switches 123 and 124. The timing 7 indicated that the tip end of the image original which has been sent to the image original mounting table has arrived at an adequate position to actuate an "image original home position" switch 122. As the result of this, the "ADF image original forwarding motor" is stopped to cause the image original to stand still on the image original mounting table. Further, this stoppage causes a "copy signal" to be turned on, thereby driving the reproduction apparatus. Simultaneously with this driving, a "folding solenoid 111" is excited in response to the operation of the image original size memory element at the timing 5. The timing 8 indicates that the photosensitive drum has entered the post-rotating cycle after completion of the image transfer, wherein it is further rotated for one revolution to clean the drum surface, and the set number of copy sheet established by the operator has coincided with the copy sheet number. The timing 9 indicates that the photosensitive drum has arrived at its home position within the reproduction apparatus, while a "coincidence signal" is being generated. When these two conditions are met, the reproduction apparatus is stopped, and the "copy signal" is thereby turned off. Further, by this stoppage of the apparatus, the "ADF image original forwarding motor" is again driven to discharge the image original from the image original mounting table, and to feed a new image original thereto. In addition, the image original size memory element set at the timing 5 is cleared so as to be prepared for storing therein a size of the subsequently fed image original. At the timing 10, feeding of a full size original (e.g. A-3 size) is again detected to store the full size. The timing 11 indicates that the image original which has so far been on the image original mounting table is discharged outside the table perfectly. Further, by this discharge signal, a "timer" is set. This signal is actuated for the purpose of turning off the "ADF image original forwarding motor" with a trailing of this timer signal, when there is no image original to follow subsequently with lapse of time set in "timer". The timing 12 indicates that the image original has passed through the abovementioned image original detection switch 123 and the image original size detection switch 124. The timing 13 indicates that the second image original has arrived at a predetermined position on the image original mounting table within a time while the "timer" is not yet turned off to actuate the "image original home position" switch 122. By this, the "ADF image original forwarding motor" is turned off, as is the case with the timing 7, whereby the "copy signal" to actuate the reproduction apparatus is turned on. Also, since the image original size memory element is set again to store therein that the image original is in full size, the "folding solenoid 111" is kept in an excited condition, and the copy cycle is repeated in the same manner. At the timing 14, the starting operation for the image original feeding is being done same as in the timing 4. The timing 15 indicates that an image original in a half size (e.g. A-4 size) is being fed, since only the image original detection switch 123 is set, whereby the image original size memory element is not set, but the situation wherein the image original is in a half size is stored. The timing 16 indicates that the abovementioned image original has passed through the abovementioned switch 123. The timing 17 indicates that the second image original is discharged from the image original mounting table, the third and last image original is fed thereinto from the image original stacking table of the ADF, and the "remaining image original detection" switch 121 is turned off, whereby the image original remains on the image original stacking table 2. The timing 18 functions the same as the timings 7 and 13, wherein, in response to the memory of the half size image original, the "folding solenoid 111" is turned off. The timing 19 indicates that the "ADF image original forwarding motor" is turned off, and the entire operations of the apparatus have been stopped, since no image original appears even after lapse of the time set in the "timer" since the third and last image original has been discharged from the image original mounting table.

Now consider a relationship between the operation of the image original size memory element and the time, in which the image transfer paper reaches the sheet folding section. Since the circuit according to the present invention is to constructed that it may respond to the rising time of the copy signal, i.e., the time instant when the reproduction apparatus commences the copying operations, and, also, as is apparent from the timing chart, since the time instant b′, in which the last copy sheet for each image original reaches the sheet folding section, is one, during which the ADF is feeding a subsequent image original to the image original mounting table, there is no possibility of such an inconvenience to take place that the "folding solenoid 111" is changed over during any arbitrary time, in which the copy paper is subjected to the folding operation in the apparatus.

FIG. 8 shows a circuit embodying the timings in FIG. 7 according to the preceding explanations.

The control circuit shown in FIG. 8 takes thereinto various input signals from a copy button switch 120 to instruct the copying operations (the output waveform of which is shown by A in FIG. 7), a remaining quantity detection switch 121 to detect whether the image originals still remain in the stack (the output waveform of which is shown by B in FIG. 7), an image original switch 122 to detect whether the image original is rightly placed at its home position (the output waveform of which is shown by D in FIG. 7), an image original detection switch 123 to detect presence of the image original (the output waveform of which is shown by L in FIG. 7), an image original size detection switch 124 to detect a size of the image original (the output waveform of which is shown by M in FIG. 7), a drum detection switch 125 to detect whether the photosensitive drum is at its home position (the output waveform of which is shown by F in FIG. 7), and a cassette switch 126 to be actuated in accordance with the size of the image transfer paper stored in the cassette, when the cassette is loaded in the reproduction apparatus.

Each of the above-mentioned switches, when it contacts to the side of "present" or "on" as in FIG. 8, leads out a high level signal to the contact, and a low level signal when it contacts to the other side, i.e. "absent" or "off". In the case of the cassette switch, however, the situation is just the opposite to the above. Since these switches are of such types that have already been explained, or of well known types, detailed explanations thereof will be dispensed with.

The control circuit shown in FIG. 8 leads out various output signals with the abovementioned various switches as the input signals therefor: "ADF signal" (a waveform C in FIG. 7) to instruct driving of the ADF image original forwarding motor; "copy signal" (a waveform E in FIG. 7) to instruct execution of the copy cycle; "folding signal" (a waveform J in FIG. 7) to instruct actuation of the folding solenoid in order to discharge the image transfer paper to the tray 6 after it is image-transferred and folded; and "upper cassette feeding signal" or "lower cassette feeding signal" to instruct driving of the paper feeding roller $39_1$ or $39_2$ in order to feed out the image transfer paper stored in the upper stage cassette or the image transfer paper stored in the lower stage cassette.

The abovementioned ADF signal is formed by a set output in the RS flip-flop 127. There can be considered two kinds of timing, wherein this ADF signal is led out. They are represented by the timings 4 and 9 in FIG. 7. The case represented by the timing 4 is such that a low level signal output is led out into the input 1 of an AND gate 128 (this AND gate is in such a logic that it leads out a low level output when a low level signal (L signal) is applied to either input 1 or 2 to set the flip-flop 127). The case represented by the timing 9 is such that the low level signal is introduced into the input 2 of the AND gate 128.

In the above-described case represented by the timing 4, the logic is constructed by an AND gate 129, so that, when the copy button switch is turned on in the state of the image original remaining quantity detection switch 121 being set to the side "present" and the image original switch 122 being set to the side "absent", the entire inputs 1, 2, and 3 of the AND gate 129 take the high level, while its input takes the low level, thereby setting the flip-flop 127.

In the above-described case represented by the timing 9, the abovementioned flip-flop 127 is set by actuating a differentiation circuit 131 by an output Q of the RS flip-flop 130 which leads out the "copy signal," and then introducing the low level differential pulse corresponding to the trailing of the flip-flop 130 into the input 2 of the AND gate 128 as an input.

There can be considered two cases, wherein the flip-flop 127 is reset and the ADF signal stops its emission. They can be represented by the timings 7 and 19 in FIG. 7. The case represented by the timing 7 is such that the low level signal is applied to the input of the AND gate 132 in FIG. 8, while the case represented by the timing 19 is such that the low level signal is applied to the input 2 of the AND gate 132. The AND gate 132 is constructed in such a logic that it may lead out a low level output signal when a low level signal is introduced into any of the inputs 1 and 2 to reset the flip-flop 127.

In the abovementioned case represented by the timing 7, the flip-flop 127 is reset by actuating the differential circuit 134 with an inverter output when the image original switch 122 has been changed over to the side "present," i.e., when the output of the inverter 133 has changed from the high level to the low level, and then by applying a low level pulse signal generated in the differential circuit 134 to the input 1 of the AND gate 132.

In the above-described case represented by the timing 19, a timer 135 is set when the image original switch 122 has been changed from "present" to "absent," and a high level signal is led out therefrom for a predetermined time period. When this timer 135 changes its output from the high level to the low level with lapse of a predetermined time, the differential circuit 136 is actuated to apply the low level pulse signal to the input 2 of the AND gate 132, thereby resetting the flip-flop 127.

Although the abovementioned "copy signal" is constructed with an output signal of the RS flip-flop 130, there may also be such a case that this flip-flop 130 is set as represented by the timing 7 in FIG. 7. In this case, an output of a NAND gate 137 is applied to the set terminal of the flip-flop 130, and an output of the abovementioned image original switch 122 is applied to the input 1 of this NAND gate 137.

As described above, such application of the output from the image original switch 122 is to cause the flip-flop 130 to be set only when the image original switch 122 is at the side of "present," and to cause the flip-flop 130 not to be set by, for example, the timing 19 in FIG. 7.

The trailing of the output Q of the flip-flop 127 is differentiated by the differentiation circuit 138, and a low level differentiation pulse is generated at an instant when the output changes from the high level to the low level. This differentiation pulse is further inverted by the inverter 139, after which it is applied to the input 2 of the NAND gate 137.

An output of a coincidence circuit 140 is applied to the input 3 of the NAND gate 137, and an output of an RS flip-flop 141 as the image original size memory element is applied to the input 1 of the coincidence circuit 141, and a size signal output of the cassette selected by the selector 142 is applied to the input 2 thereof. Accordingly, only when the image original size signal applied to the input 1 of this coincidence circuit 140 meets the size (which means both the full size and the half size) of the image transfer paper stored in the cassette selected by the selector 142, a high level signal can be led out in the output of the coincidence circuit 140, and this high level signal is applied to the input 3 of the abovementioned NAND gate 137.

As the result, the abovementioned flip-flop 130 is set when the image original switch 122 is at the side of "present," the image original size signal coincides with the size of the image transfer paper, and the flip-flop 127 changes from its set condition to its reset condition.

The resetting of the flip-flop 130 and stoppage in emission of the copy signal are represented by the timing 9 as shown in FIG. 7. In more detail, this flip-flop 130 is reset by an output from the NAND gate 143, wherein an output of the drum detection switch 125 is applied to the input 1 thereof, and an output of the coincidence circuit 146, which leads out the high level signal when the contents of the counters 144, 145 are coincided as the result of comparison, is applied to the input 2 thereof.

Incidentally, the counter 144 is to store therein the number of copy sheet set by the abovementioned copy sheet number setting key 12, while the counter 145 is to count the number of copy sheet to be copied from one and the same image original.

The folding signal is composed of an output Q of a JK flip-flop 147. To the J-terminal of this flip-flop 147, there is applied an output Q of the abovementioned flip-flop 141, while an output Q of the flip-flop 130 is applied to the CP-terminal thereof. The flip-flop 141 receives an output of the NAND gate 148 to its set terminals. To the input 1 of this NAND gate 148, there is applied an output of the image original detection switch 123, and to the input 2 thereof, there is applied an output of the image original size detection switch 124. Therefore, the flip-flop 141 can be set only when the outputs of both switches 123, 124 are at the side of "present". In other words, while the flip-flop 141 is leading out the output Q, the image original size is shown to be in the full size (which is required to be discharged in a folded state). On the other hand, when output Q is not being led out therefrom (a state, wherein the image original detection switch 123 is at the side of "present," and the switch 124 is at "absent"), no output Q is led out, and the image original size is shown to be in the half size (which is not required to be discharged in the folded state).

As is apparent from the foregoing explanations, the folding signal is led out when the full size signal is led out of the flip-flop 141, and the copy signal is led out of the flip-flop 130.

Since an output of the abovementioned differentiation circuit 131 is applied to the reset input of the flip-flop 141, and the output Q of this flip-flop 141 is applied to the K-terminal of the flip-flop 147 through the inverter 149, the flip-flop 147 stops emission of the output Q (emission of the solenoid signal) by the level change in the copy signal from low to high in the state of the image original size having been detected to be in the half size, as shown in the timing 18 of FIG. 7.

The abovementioned size signal is applied to the abovementioned coincidence circuit 140 through a signal line 150. In the following, more detailed explanations will be given as to leading out of the upper cassette feeding signal and the lower cassette feeding signal.

The abovementioned cassette switch 126 has a group of three switches MS1 to MS3 to be actuated when the cassette $4_1$ is loaded in the upper cassette mount, and another group of three switches MS4 to MS6 to be actuated when the cassette $4_2$ is loaded in the lower cassette mount. Each of the switches MS1 to MS6 is controlled as shown in the following Table in accordance with the size of the image transfer paper stored in the cassette as loaded (i.e., cassette size).

TABLE

| Cassette size | Switch | | | |
|---|---|---|---|---|
| | MS1 or MS4 | MS2 or MS5 | MS3 or MS6 | |
| A3 | OFF | OFF | OFF | FULL SIZE |
| B4 | ON | OFF | OFF | |
| U1 | OFF | ON | OFF | |
| A4 | OFF | OFF | ON | HALF SIZE |
| B5 | ON | OFF | ON | |
| U2 | OFF | ON | ON | |

(NOTE: "U" denotes a universal cassette.)

A selector 142 is so constructed that the outputs of the switches MS1 to MS3 may be produced at the outputs 1 to 3 thereof, when the outputs of the switches MS to be controlled as mentioned above are applied to the selector 142, while a low level signal is led out to the signal line 151 to be applied to the terminal a thereof, and that the outputs of the switches MS4 to MS6 may be produced at the outputs 1 to 3 thereof, when a high level signal is led out to the signal line 151 to be applied to the terminal a. Therefore, paying attention to the output 3 of the selector 142, if the high level signal is led out of this output 3 due to turning off of the switches MS, the full size cassette is selected, as is apparent from the above Table, and, if the low level signal is led out thereof due to turning on of the switches MS, the half size cassette is selected. Accordingly, in case the output Q of the abovementioned flip-flop 141 is applied to the input 1 of the coincidence circuit 140, and the signal of the output 3 of the selector 142 is applied to the input 2 thereof, the coincidence circuit 140 leads out the high level signal when the image original size and the cassette size are coincided (e.g., both in the full size), and it leads out the low level signal when the image original size and the cassette size are not coincided, (e.g., one in the full size and the other in the half size).

Accordingly, when the image original size and the cassette size are not coincided, no set signal input is introduced into the flip-flop 130, hence no copy signal is led out, because a low level signal is applied to the NAND gate 137 through the signal line 152. This low level signal is also applied to the input 1 of the AND gate 154, after it is rendered a high level signal by the inverter 153. Further, as an oscillating output of an oscillator 155 (the oscillating output varies between the high level and the low level) is applied to the input 2 of the AND gate 154, a pulse having a higher level than that of the AND gate 154 is applied to the CP-terminal of the JK flip-flop 156 by application of an initial high level pulse in the oscillating output. Then, the flip-flop 156 is inverted by application of such pulse, whereby the signal level on the signal line 151 also changes, and the cassette to be selected is changed from the upper cassette mount to the lower cassette mount, or vice versa.

As the result of changing the cassette to be selected as mentioned in the preceding, when the image original size and the cassette size become coincident, the low level signal is applied to the input 1 of the AND gate 154, so that the oscillating output of the oscillator 155 is not applied to the CP terminal of the flip-flop 156, and this coincided state is maintained. Since the output Q of the flip-flop 156 is applied to the input 2 of the AND gate 157, the output $\overline{Q}$ thereof is applied to the input 2 of the AND gate 158, and the image transfer paper forwarding signal (such signal is well known in the ordinary reproduction apparatus) is applied to the inputs 1 of the respective AND gates 157, 158, there can be realized automatic cassette selection depending on the size of the image original, when the output from the AND gate 157 is made a solenoid actuating signal for actuating an electro-magnetic driving device (not shown) to urge the paper feeding roller $39_2$ onto the image transfer paper $5_2$ in FIG. 2, and the output from the AND gate 158 is made the solenoid actuating signal for actuating an electromagnetic driving device (not shown) to urge the paper feeding roller $39_1$ onto the image transfer paper $5_1$ in FIG. 2.

It should, however, be noted that, in the abovedescribed embodiment, the image original is in either the full size or the half size, although the paper size belonging to the full size and the half size, respectively, is of three kinds as exemplified in the foregoing, hence it cannot always be said that the image original size accurately coincides with the paper size. In order to avoid such inconvenience in the practical operation, the reproduction apparatus of the present embodiment is so constructed that a full size image original of one kind and a half size to this full size original are placed on the abovementioned image original stacking table, while two kinds of paper cassettes corresponding in size to the full and half size image originals are loaded in the apparatus. By this arrangement, the image transfer from the original to the transfer paper can be carried out in exact conformance in size, and, moreover, the full size recording paper can be folded into two, whereby all the recording paper to be discharged to the tray 6 can be made the same size. Further, when a plurality of the image original size detection switches are provided, by the outputs of which the image original size is made to be discriminated such as A-3, B-4, etc., it is possible to select the accurately coincided paper from the cassette loaded in the reproduction apparatus, thereby successfully recording the original image onto the paper.

Figure 9A:
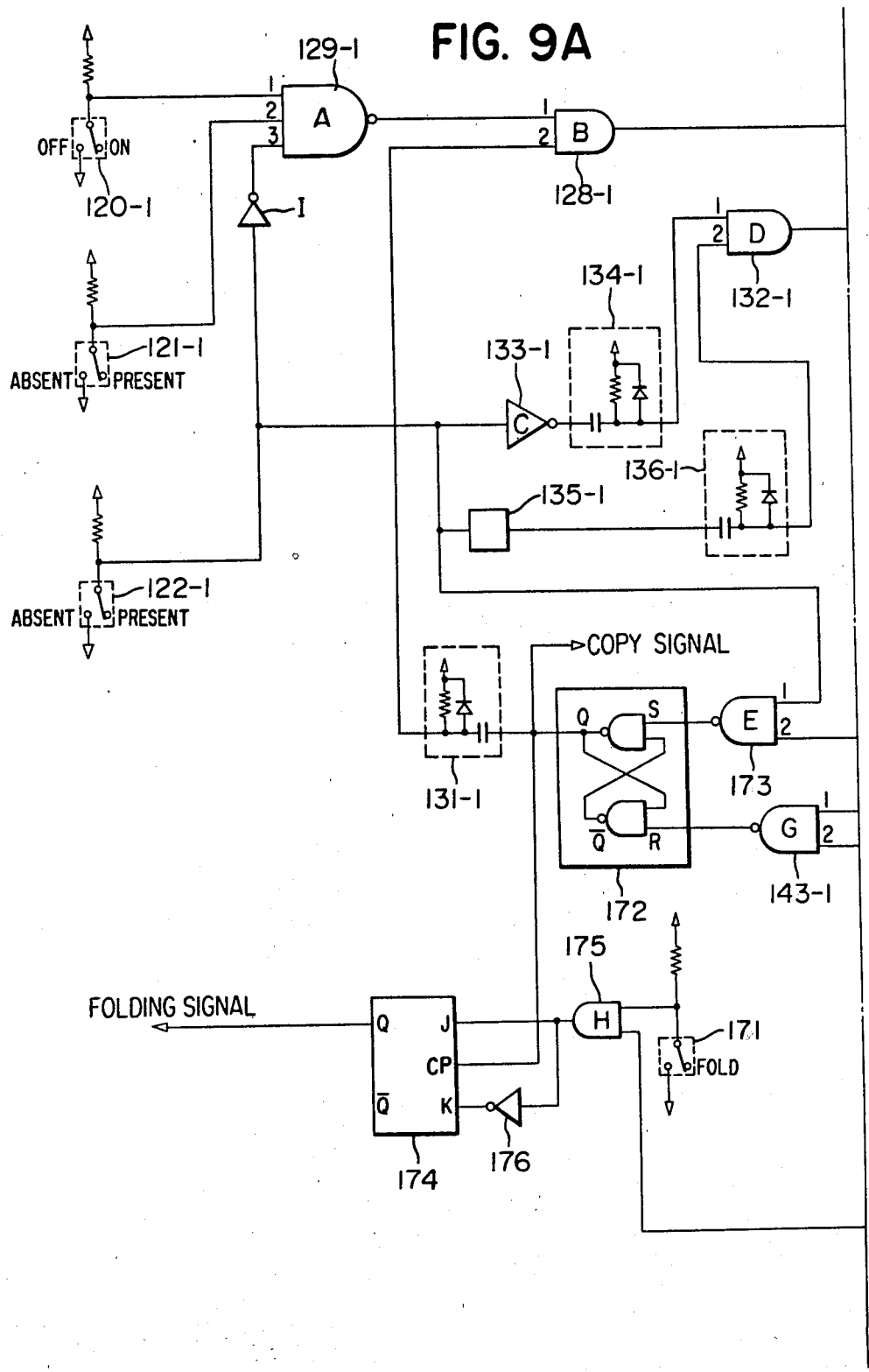
FIG. 9 is also a circuit diagram showing a main part of another embodiment of the control circuit for the recording device of the present invention.
Figure 10A:
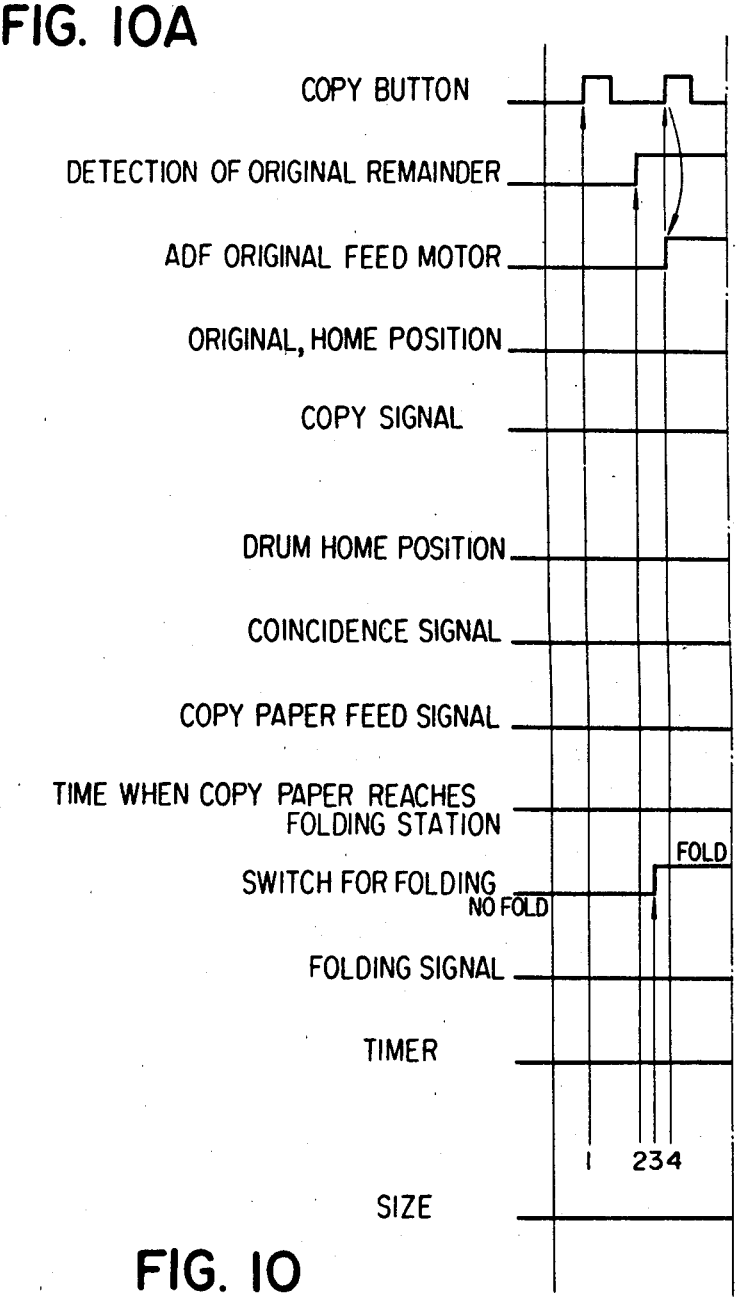
FIG. 10 is a signal waveform chart showing operative states of the recording device incorporating therein the circuit shown in FIG. 9.
Figure 10:
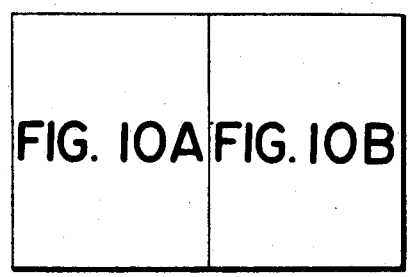
Figure 10B:
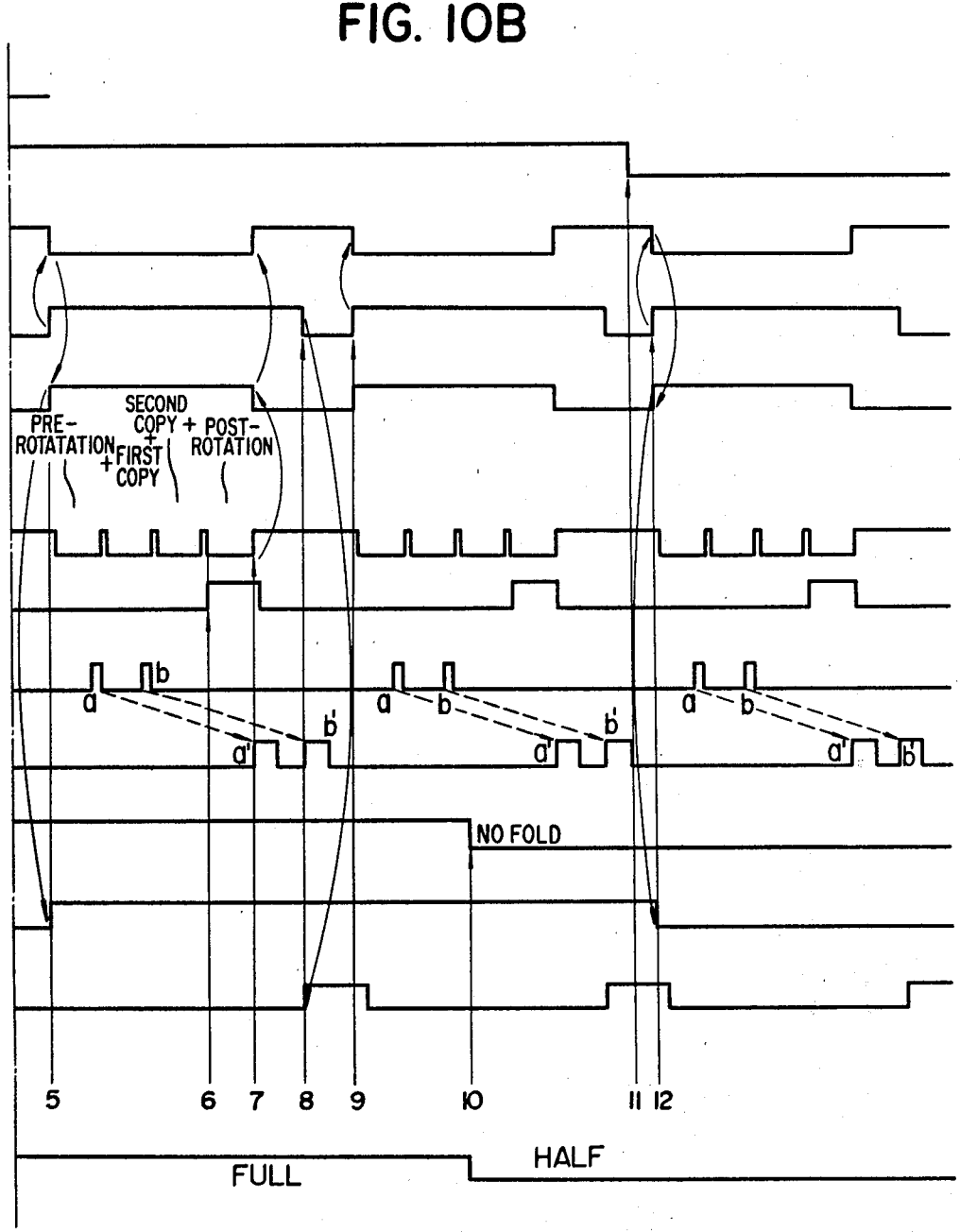

FIGS. 9 and 10 illustrate another embodiment of the control circuit for the recording apparatus according to the present invention. In the control circuit shown in FIG. 8, the upper or low cassettes are selected by the cassette selection switch 170 which is controlled manually, and the folding signal is generated by the manually controlled folding switch 171. In the control circuit of FIG. 9, the switches 123, 124 to discriminate the image original size and the circuits related thereto as well as the coincidence circuit 140 and the circuits related thereto are all omitted. It should be noted that the circuit components in FIG. 9 which function in the same manner as those in FIG. 8 are designated by the same reference numerals with a suffix −1 being added thereto, hence detailed explanations thereof will be dispensed with.

Explaining the differences in FIGS. 9 from FIG. 8, only two inputs are applied to the inputs of the NAND gate 173 connected to the set inputs of the flip-flop 172 which generates the copy signal. Accordingly, when the image original reaches its home position, and the ADF signal trails, the copy signal is led out as indicated in the respective timings 5, 9 and 12 in FIG. 10. Also, an output of the AND gate 175 is applied to the JK-terminals of the JK flip-flop 174 which generates the folding signal either directly or through the inverter 176. To this AND gate 175, there are applied the output 3 (when this output is at the high level, the full size cassette is selected, and when it is at the low level, the half size cassette is selected, as already mentioned in the foregoing) of the selector, and the output of the folding switch 171. Accordingly, the folding instruction is issued from this AND gate 175 by means of the folding switch 171, and the high level signal is led out only when the full size cassette is selected. Thus, in the state of the high level signal being led out, the copy signal is applied, and the folding signal is led out of the output Q of the flip-flop 174.

What we claim is:

1. A recording device comprising:
   (a) mounting means to mount thereon an original carrying image information to be recorded;
   (b) feeding means to feed the original onto said mounting means;
   (c) image recording means which reads the image informations on the image original placed on said image original mounting means by scanning the same, and records the image informations as a visible image on a flexible sheet recording medium;
   (d) detection means to detect arrival of the image original fed from said image original feeding means onto said mounting means at a predetermined position thereof;
   (e) recording start instruction means to initiate recording by said image recording means through a detected output of said image original detection means;
   (f) conveying means to convey the sheet recording medium, on which the visible image has been formed by said image recording means;
   (g) engaging and stopping means to engage and stop further movement of a sheet recording medium conveyed by said conveying means; and
   (h) means for instructing whether to deliver the recording medium conveyed by said conveying means in a folded state or without folding.

2. The recording device as claimed in claim 1, wherein said feeding means includes stacking means which mounts thereon a stack of and transfer means which takes out a single from the stack of originals mounted on said original stacking means and transfers the same onto said original mounting means.

3. The recording device as claimed in claim 1, wherein said original feeding means is so constructed that it may feed said original onto said original mounting means in the direction substantially perpendicular to the scanning direction of said original.

4. The recording device as claimed in claim 1, further including stopper means to cause the original fed from said image original feeding means onto the image original mounting means to stop at a predetermined position on said image original mounting means.

5. A recording device comprising:
   (a) mounting means for mounting thereon an original carrying image information to be recorded;
   (b) feeding means to feed the onto said image original mounting means;
   (c) image recording means which reads the image information on the original placed on said original mounting means by scanning the same, and records the image informations as a visible image onto a flexible sheet recording medium;
   (d) detection means to detect arrival of the original fed from said original feeding means onto the mounting means at a predetermined position on said mounting means;
   (e) stopper means to detect arrival of the original by said detection means, and to stop feeding of the original by said original feeding means;
   (f) discharge means to discharge the original on said original mounting means from the means;
   (g) timing means to be driven in synchronism with discharge of the original by said original discharge means; and
   (h) stopping means to stop driving of said original feeding means when said detection means does not detect arrival of the original within a timing of a certain definite time by said timing means.

6. The recording device as claimed in claim 5, wherein said feeding means and said discharge means have a common driving means.

7. The recording device as claimed in claim 5, further including stacking means to place thereon a stack of for feeding onto said mounting means by said image original feeding means.

8. The recording device comprising:
   (a) mounting means for mounting thereon an original carrying image information to be recorded;
   (b) feeding means to feed the original onto said mounting means, and original stacking means for placing thereon a stack of originals for being fed onto said mounting means by said feeding means;

(c) image recording means which reads the image information on the original placed on said original mounting means by scanning the same, and records the image information as a visible image onto a flexible-sheet recording medium;

(d) detection means to detect arrival of the image original fed from said original feeding means onto the mounting means at a predetermined position on said mounting means;

(e) stopper means to detect arrival of the original by said detection means, and to stop feeding of the original by said original feeding means;

(f) discharge means to discharge the original on said original mounting means from the mounting means;

(g) timing means to be driven in synchronism with discharge of the original by said original discharge means;

(h) stopping means to stop driving of said feeding means when said detection means does not detect arrival of the original within a timing of a certain definite time by said timing means; and (i) further including residual original detection means to discriminate whether or not the original still remains on the stacking means.

9. The recording device as claimed in claim 6, wherein said timing means is driven by said original when it passes through said detection means.

10. A recording device comprising:

(a) mounting means to mount thereon an original carrying to be recorded;

(b) size detection means to detect a size of said original;

(c) a plurality of storing means, each of which stores therein sheet recording mediums in a predetermined size;

(d) image recording means to read the image information on the original placed on said original mounting means by scanning the same, and to record the image information as a visible image onto the sheet recording medium drawn from the selected storing means;

(e) size detection means to detect a size of the sheet recording mediums stored in each of said storing means, and to give notification of the size as detected; and (f) storage selection means which selects other storing means when the size of the original detected by said size detection means and the size of the sheet recording medium notified by size notifying means in said storing means as selected do not coincide.

11. The recording device as claimed in claim 10, wherein said storage selection means includes a selector to produce an output of one size notifying means by applying outputs of the respective size notifying means, coincidence discrimination means to discriminate whether the output from the size notifying means selected by said selector coincides with a size of the original detected by said size detection means, and selection control means to control in such a manner that an output of the other size notifying means may be selected by said selector, when non-coincidence is detected by said coincidence discrimination means.

12. The recording device as claimed in claim 10 or 11, further including a plurality of sheet recording medium feeding means which draw out the sheet recording medium from respective storing means, and feed the same to said recording means.

13. A recording device comprising:

means for mounting thereon an original carrying image information to be recorded;

means, having an entrance, for feeding the original introduced through the entrance to the original mounting means;

recording means for reading the image information of the original fed to said original mounting means by said original feeding means, and recording it on a flexible sheet recording medium as a visible image;

means for two-folding the recording medium having the recorded image; and means for instructing whether to deliver the recording medium having the recorded image in a two-folded state or without fold.

14. The recording device as claimed in claim 13, wherein said original feeding means includes original stacking means which mounts thereon a stack of originals, and original transfer means which takes out a single original from the stack of originals mounted on said original stacking means and transfers the same onto said original mounting means.

15. The recording device as claimed in claim 13, wherein said original feeding means is so constructed that it may feed said original onto said original mounting means in the direction substantially perpendicular to the scanning direction of said original.

16. The recording device as claimed in claim 13, wherein said original feeding means is provided at one part thereof with original discrimination means to discriminate a size of the original.

17. A recording device as claimed in claim 16, further including:

(a) engaging and stopping means which detects arrival of the original by said original detection means, and stops feeding of the original by said feeding means;

(b) original discharge means which discharges the image original on said original mounting means from said original mounting means;

(c) timing means which is actuated in synchronism with discharge of the original by said original discharge means; and (d) original feeding stoppage means which stops operations of said original feeding means when said original detection means does not detect arrival of the original within a timing of a certain definite time by said timing means.

18. The recording device as claimed in claim 13, further including stopper means to cause the original fed from said original feeding means onto the original mounting means to stop at a predetermined position on said original mounting means.

19. A recording apparatus, comprising:

means for mounting an original;

means for conveying the original, fed from an original feeding station, to said original mounting means;

means for recording on a recording medium the information carried on the original conveyed by said conveying means;

means for two-folding the recording medium having the information recorded by said recording means; and control means for receiving a signal provided by said conveying means and controlling said folding means.

20. A recording apparatus, comprising:

means for mounting thereon an original carrying image information to be recorded;

means for conveying the original to feed it to and discharge it from a predetermined position of said mounting means;

means for recording the image information of the original fed to the predetermined position by said conveying means on a sheet recording medium as a visible image;

timer means actuated in synchronism with the discharge of the original by said conveying means; and means for stopping the original feeding operation of said original conveying means when the original does not reach a predetermined position on said original mounting means within a predetermined period set by said timer means.

* * * * *

UNITED STATES PATENT AND TRADEMARK OFFICE
CERTIFICATE OF CORRECTION

PATENT NO. :   4,371,256

DATED      :   February 1, 1983

INVENTOR(S) :  SHIGERU YOSHIMURA, ET AL.

It is certified that error appears in the above-identified patent and that said Letters Patent is hereby corrected as shown below:

Col. 1, line 20, change "given" to --give--;

line 49, delete the comma after "a"; and insert a comma after "operator".

Col. 2, line 1, change "other" to --another--;

line 5, change "other" to --another--;

line 57, insert --a-- before "sheet";

line 58, delete the word "like";

line 66, before "stack" insert --a--.

Col. 4, line 26, delete "the" (second occurrence);

line 40, change "detachable attachable" to

--detachable-attachable--;

UNITED STATES PATENT AND TRADEMARK OFFICE
CERTIFICATE OF CORRECTION

PATENT NO. : 4,371,256

DATED : February 1, 1983

INVENTOR(S) : SHIGERU YOSHIMURA, ET AL.

It is certified that error appears in the above-identified patent and that said Letters Patent is hereby corrected as shown below:

Col. 4, line 41, change "are various" to --vary--;

line 55, change "straightforwarded" to --straightforward--

Col. 6, line 23, insert --the-- before "presence";

line 25, change "bolt" to --belt--;

line 43, insert --the-- before "driving".

Col. 8, line 30, change "4 and 6" to --4 to 6--;

line 55, change "be" (second occurrence) to --are--;

line 57, change "be" to --is--.

Col. 9, line 12, change "indicated" to --indicates--.

Col. 10, line 28, change "to" (first occurrence) to --so--.

Col. 12, line 61, change "sheet" to --sheets--;

line 63, change "sheet" to --sheets--.

Col. 13, line 62, underline "a" after "terminal";

line 66, underline "a" after "terminal".

UNITED STATES PATENT AND TRADEMARK OFFICE
CERTIFICATE OF CORRECTION

PATENT NO. : 4,371,256

DATED : February 1, 1983

INVENTOR(S) : SHIGERU YOSHIMURA, ET AL.

It is certified that error appears in the above-identified patent and that said Letters Patent is hereby corrected as shown below:

Col. 16, line 16, after "of" insert --originals--;

line 17, after "single" insert --original--;

line 33, insert --original-- before "onto";

line 48, insert --mounting-- after "the";

line 60, insert --originals-- before "for".

Col. 17, line 33, insert --image information-- after "carrying".

Signed and Sealed this

Seventeenth Day of January 1984

[SEAL]

Attest:

GERALD J. MOSSINGHOFF

Attesting Officer

Commissioner of Patents and Trademarks